(12) United States Patent
Beltowski et al.

(10) Patent No.: US 10,384,588 B2
(45) Date of Patent: Aug. 20, 2019

(54) CABLE TONNEAU COVER

(71) Applicant: Bestop, Inc., Louisville, CO (US)

(72) Inventors: Michael Beltowski, Firestone, CO (US); George C. Stickles, Thornton, CO (US); Rick H. Troeger, Westminster, CO (US); Richard Essig, Berthoud, CO (US); Tavis Lutzka, Rochester Hills, MI (US)

(73) Assignee: Bestop, Inc., Louisville, CO (US)

( * ) Notice: Subject to any disclaimer, the term of this patent is extended or adjusted under 35 U.S.C. 154(b) by 26 days.

(21) Appl. No.: 15/865,338

(22) Filed: Jan. 9, 2018

(65) Prior Publication Data

US 2018/0126895 A1    May 10, 2018

Related U.S. Application Data

(63) Continuation of application No. 15/099,187, filed on Apr. 14, 2016, now Pat. No. 9,889,789.

(60) Provisional application No. 62/147,856, filed on Apr. 15, 2015.

(51) Int. Cl.
| | |
|---|---|
| *B60P 7/04* | (2006.01) |
| *B60J 7/10* | (2006.01) |
| *B60J 7/12* | (2006.01) |
| *B60J 7/08* | (2006.01) |

(52) U.S. Cl.
CPC ............. *B60P 7/04* (2013.01); *B60J 7/085* (2013.01); *B60J 7/102* (2013.01); *B60J 7/104* (2013.01); *B60J 7/12* (2013.01)

(58) Field of Classification Search
CPC .... B60P 7/04; B60J 7/085; B60J 7/102; B60J 7/104; B60J 7/12
See application file for complete search history.

(56) References Cited

U.S. PATENT DOCUMENTS

| | | | |
|---|---|---|---|
| 4,813,734 A | 3/1989 | Hoover | |
| 6,257,647 B1 | 7/2001 | Ninness et al. | |
| 2004/0195858 A1 | 10/2004 | Martin | |
| 2012/0025560 A1 | 2/2012 | Huotari et al. | |

*Primary Examiner* — D Glenn Dayoan
*Assistant Examiner* — Melissa A Black
(74) *Attorney, Agent, or Firm* — Warn Partners, P.C.

(57) ABSTRACT

A tonneau cover assembly with a top cover connected to a cable tensioning system that eliminates the need for side rails to both locate and tension the top cover. The cable tension system seals out environmental elements and holds the tonneau cover and fabric management bows of the assembly in place. The assembly includes a front attachment assembly and rear attachment assembly connected to cables, where the front attachment provides a forward mounting location and seals a front bow to the vehicle. The rear attachment assembly holds the top cover in a closed tensioned state until the cover is opened by an operator. The tonneau cover assembly reduces weight and complexity, while eliminating the need for side rails.

20 Claims, 4 Drawing Sheets

CABLE TONNEAU COVER

CROSS REFERENCE TO RELATED APPLICATIONS

This application is a continuation of U.S. patent application Ser. No. 15/099,187, filed Apr. 14, 2016, which claims the benefit of U.S. Provisional Application No. 62/147,856, filed Apr. 15, 2015. The disclosures of the above application applications are incorporated herein by reference.

FIELD OF THE INVENTION

The present invention relates to a bed cover assembly for a cargo bed of a vehicle.

BACKGROUND OF THE INVENTION

Removable or stowable soft tonneau covers for pickup vehicles are known in the art. These tonneau covers provide access to the cargo bed when the cover is manually at least partially removed, or, provided protection from the elements when the cover is on/deployed.

Currently, tonneau covers have a rail that must be mounted down each side of the pickup box to give the fabric a place to attach and seal out the elements. These side rails also act as a locator, aligning the bows of the top cover as it is installed and provide a way to tension the top cover fabric. Having to install these rails leads to additional height on the vehicle, a non-cohesive look, and addition weight/complexity in the top.

There are other tonneau systems that are labeled as "low profile" to help fight the height and non-cohesive look. However, these covers still use an additional rail to mount the cover to the pickup bed and gain fabric tension, resulting in the low profile design having a different geometry, but without eliminating all of the problems of a conventional tonneau cover.

Therefore, there remains a need for a tonneau cover with a tensioning system that eliminates the need for side rails.

SUMMARY OF THE INVENTION

A tonneau cover assembly having a cable assembly that allows the tonneau system to tension a top cover, providing tension along the side of the cover to seal the cover to a bedside of a vehicle. The tonneau cover assembly using cables running down either side of the cover solves the aforementioned issues. Using a cable running fore and aft on the pickup truck bedside eliminates the need for the side rails to both locate and tension the top cover. The cable tension works to seal out the elements and holds the tonneau cover and bows in place.

With a rear mounting feature of the present invention it is readily implementable both as an add on bracket or as an integrated feature in a truck bed. A rear latching system holds the tonneau in the closed tension state keeping the tonneau secured and tight until the cover is opened by an operator. A front attachment feature provides a forward mounting location for the assembly and sealing location to the bulkhead of the vehicle bed without the need to drill mounting holes. Optionally, an integrated boot cover is also sewn into the top cover at the front or rear so that when the tonneau cover is rolled up in the stowed position, the boot cover can wrap and protect the top cover. Using this design eliminates weight, complexity, and the side rails when compared to a current tonneau system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
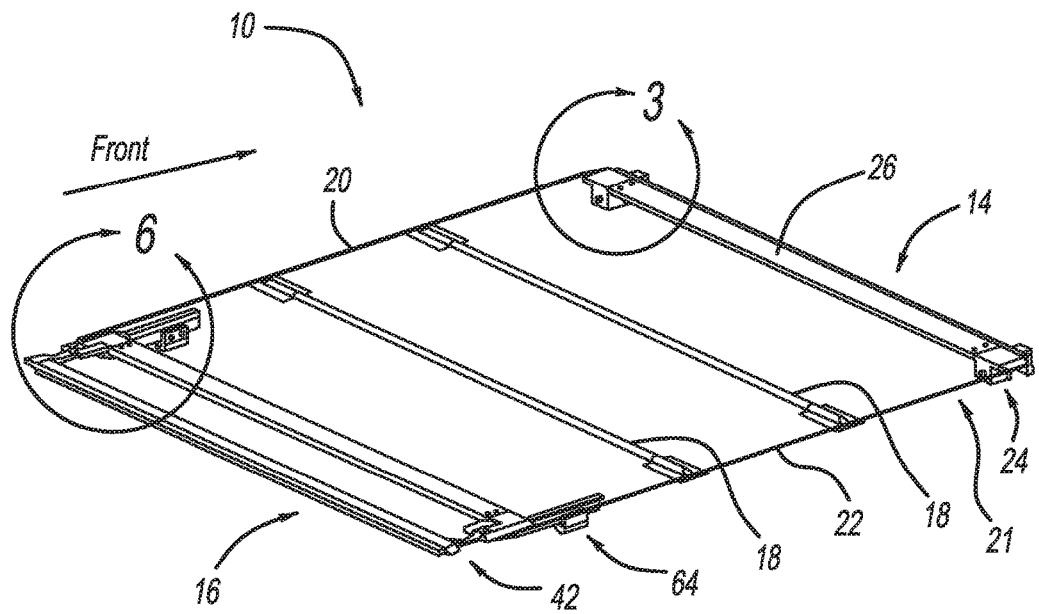
FIG. 1 is right side rear perspective view of a tonneau cover assembly according to the present invention, with the cover material omitted for clarity.
Figure 2:
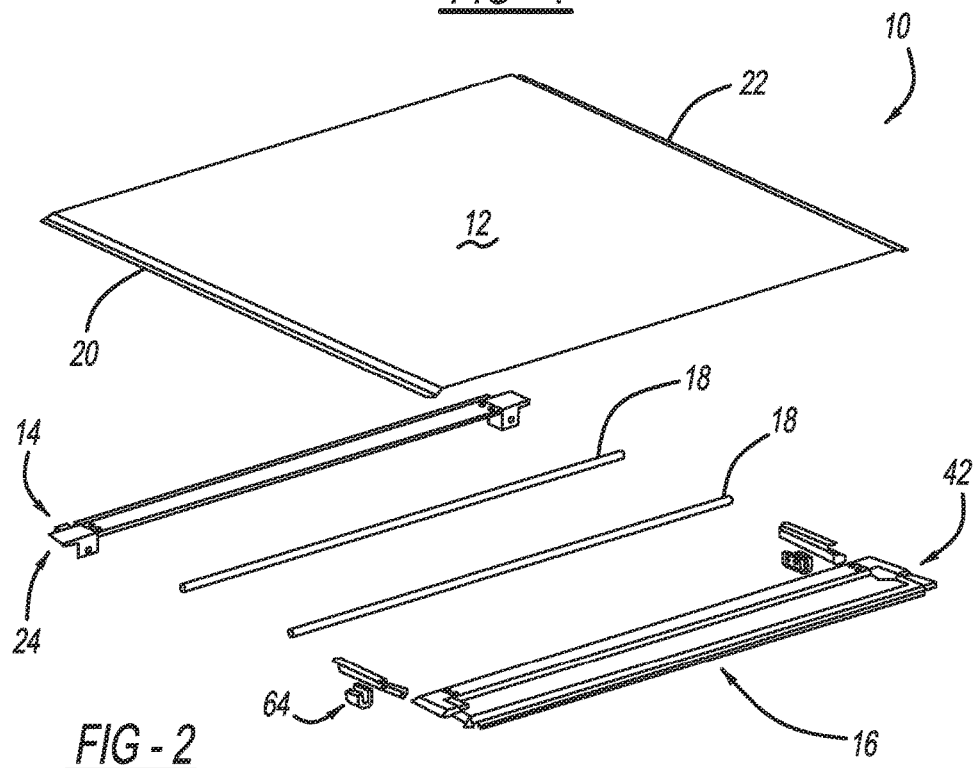
FIG. 2 is an exploded view of the tonneau cover assembly shown from the left side rear perspective, in accordance with the present invention.

The following description of the preferred embodiment(s) is merely exemplary in nature and is in no way intended to limit the invention, its application, or uses.

Referring to the figures generally, the term "front" refers to the front of the vehicle, cab area, as indicated by the arrow.

Referring to FIGS. 1-8 generally, there is generally provided a tonneau cover assembly shown generally at 10 having a cover 12, e.g., fabric material, soft or flexible material, vinyl or any other suitable material and combinations thereof depending on the application. The tonneau cover assembly 10 also has a front attachment assembly 14, rear attachment assembly 16 and at least one, preferably, a plurality of, cover management bows 18. These cover management bows 18, most preferably, two bows, are center fabric management bows located between the front attachment assembly 14 and rear attachment assembly 16 running cross bed.

The tonneau cover assembly 10 is provided with a tensioning system 21 including at least a first tension cable 20 and a second tension cable 22 operably connected to front and rear attachment blocks, as will be explained in greater detail below. The cables are of the same or different predetermined suitable type(s) and diameter(s) for providing predetermined tension and tension release forces, dependant on the application. In a preferred embodiment, the cable assembly 21 allows the tonneau system 10 to tension the top cover 12, provides tension along the side of the cover to seal the cover to the bedside of the vehicle, and provides side to side location to assist in locating the cover 12 and fabric management bows 18.

Preferably, the cables 20,22 are provided in pockets sewn along the sides of the cover 12.

The front attachment assembly 14 includes a pair of front attachment blocks 24 each connected to the respective ends of a first bow 26 that is a front bulkhead bow. The front attachment blocks 24 provide a no drill attachment toward the bulkhead of the cargo bed. An attachment arm 28 is operably connected to either of the front attachment blocks 24 for attaching the front of the assembly 10, as will be explained in greater detail below. A cable attachment feature 30, e.g., with a first aperture, is formed in both of the front attachment blocks 24 allowing for first mounting locations for the cable tensioning system 21. The first aperture preferably is formed on this outward feature of both of the front attachment blocks 24 for connecting both the first and second tension cables 20, 22.

Figure 3:
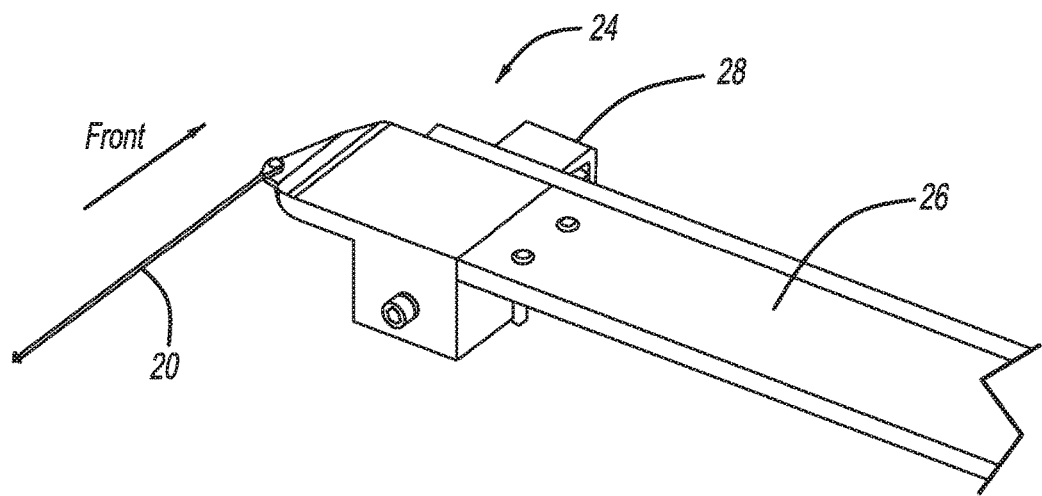
FIG. 3 is an enlarged rear perspective view of a portion of a front attachment assembly of FIG. 1 including a front attachment block connected to a bulkhead bow and a first tension cable, in accordance with the present invention.
Figure 4:
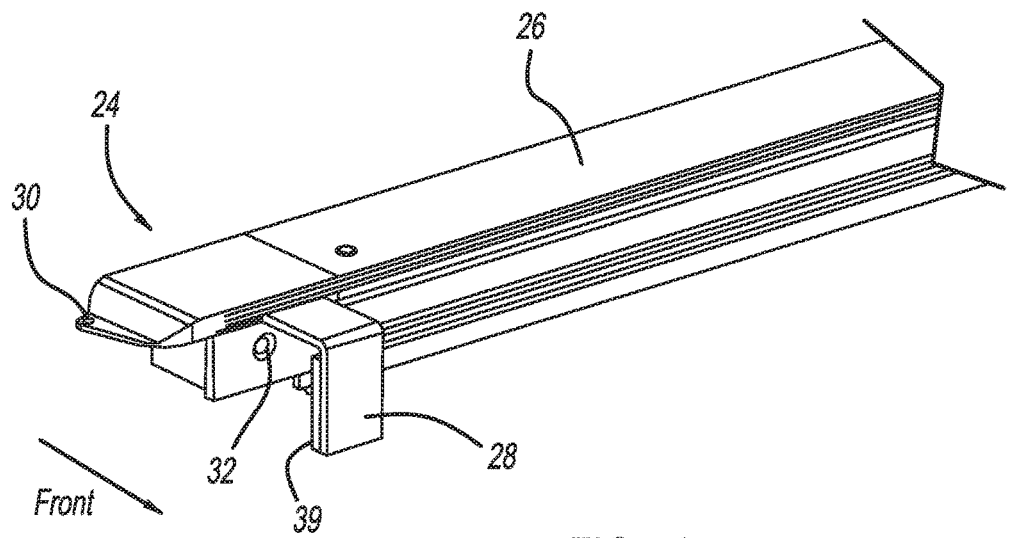
FIG. 4 is a front perspective view of the front attachment assembly, in accordance with the present invention.
Figure 5:
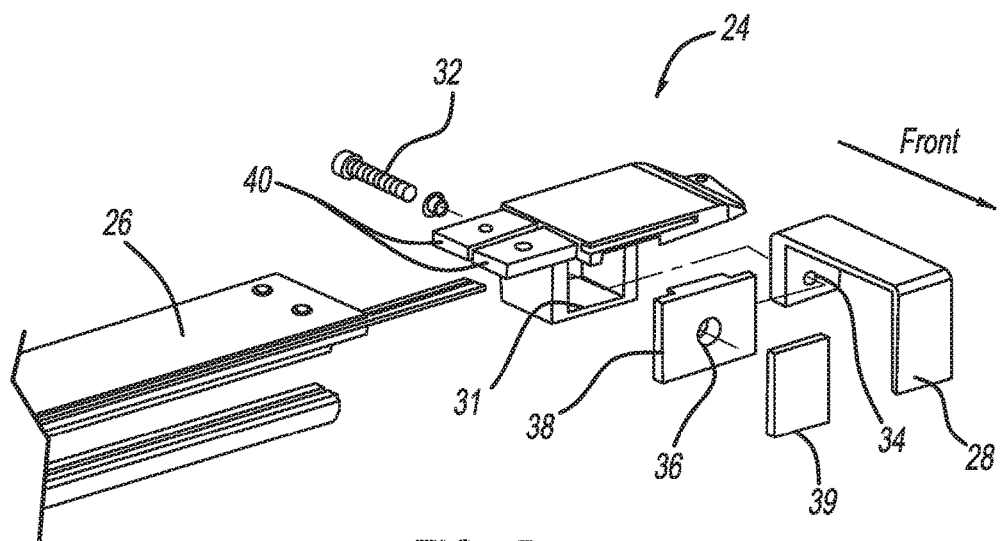
FIG. 5 is an exploded front view of the front attachment assembly according to the present invention.
Figure 6:
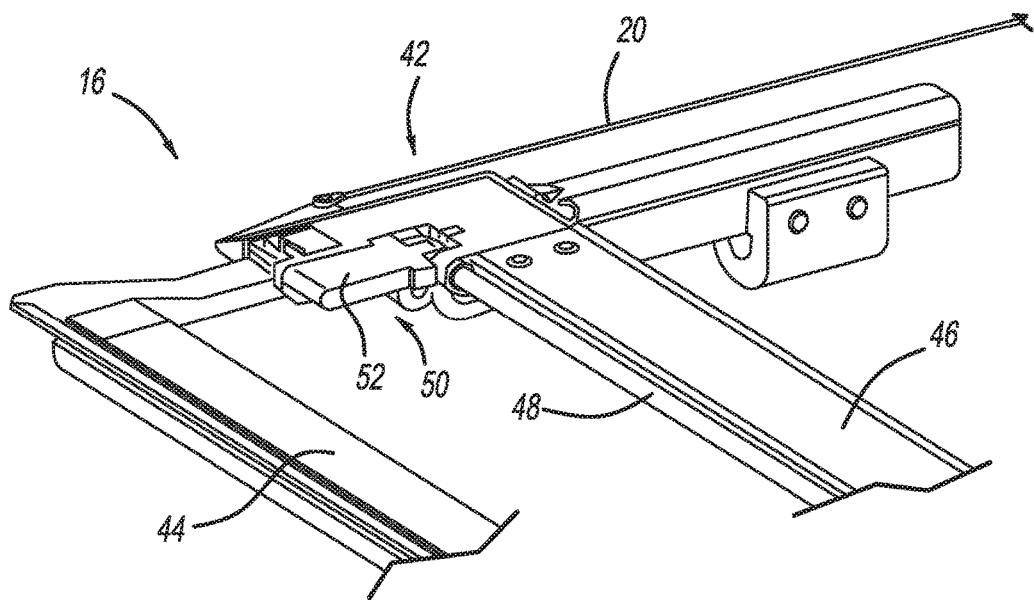
FIG. 6 is an enlarged view of a portion of a rear attachment assembly of FIG. 1 including a rear attachment block connected to the first tension cable, in accordance with the present invention.
Figure 7:
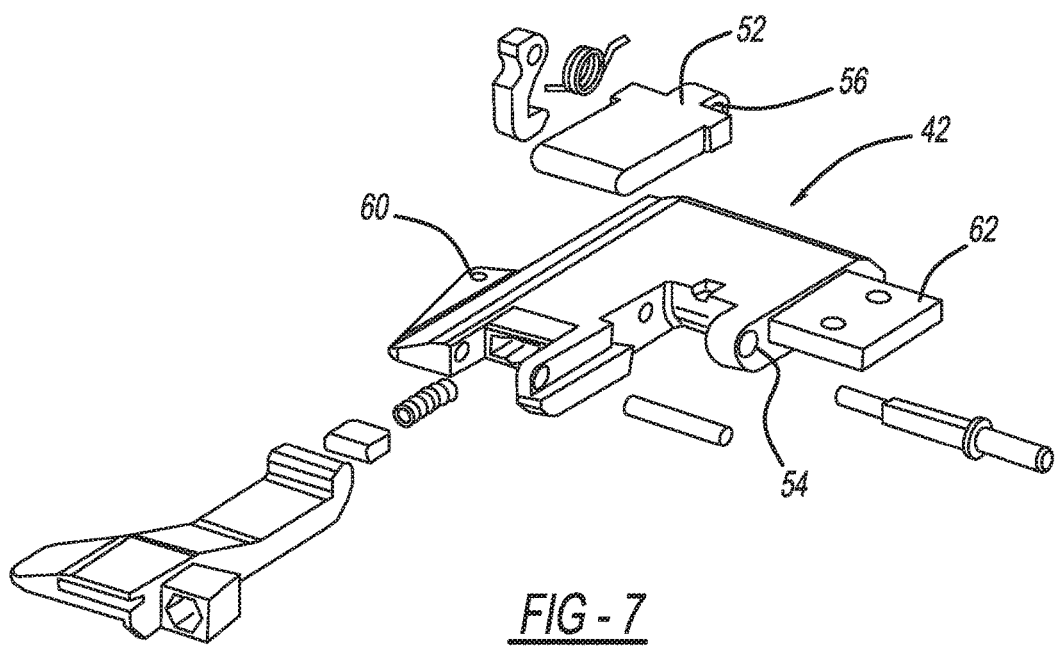
FIG. 7 is an exploded view of the rear attachment block and a partial opening feature, according to an embodiment of the present invention; and, FIG. 8 is an enlarged rear perspective view of a portion of FIG. 1 showing one end of each of a pair of cover management bows, according to an embodiment of the present invention.

Referring to the Figures generally, and more particularly to FIGS. 3-5, in a preferred embodiment, the attachment arm 28 is generally U-shaped, with two lower depending arms, and is sized to partially fit within an opening 31 formed in the front attachment blocks 24. At least one first fastener 32, e.g., an attachment bolt, is extendable through at least a second aperture 34 provided on one of the lower depending arms of the attachment arm 28 and a third aperture 36 formed in a first brace 38. A second brace 39 is held, e.g., using adhesive and/or fastener(s), against the inside of the other lower depending arm for mounting to the vehicle. Thus, once the first bow 26, or "front bulkhead" referred to interchangeably herein, is put in place on the vehicle and then the fastener 32 is tightened, this draws the attachment arm 28 rearward fixing and sealing the front bulkhead 26 to the bulkhead of the vehicle's bed.

The first pair of front attachment blocks 24 are also provided with at least one first mounting bracket 40, preferably two side-by-side, to connect to the first bow 26. In a preferred embodiment, a respective mounting bracket 40 slides into each end of the first bow 26 and fasteners, e.g., bolts, are provided to fix the first bow 26 to the first mounting bracket 40.

Referring to the Figures generally, and more particularly to FIGS. 1-2 and 6-7, the rear attachment assembly 16 allows tension to be applied using the cable tension system 21, eliminating the need for side rails to seal the tonneau cover 12 to the vehicle bed. A pair of rear attachment blocks 42, or "rear tension block" referred to interchangeably herein, are both operably connected to a rear bar 44 or bow, cross member 46, and a connector bar 48, which is a release latch connector bar forming part of a release latch mechanism indicated generally at 50. The release latch mechanism 50 has a pair of release latches 52 operably connected to respective rear attachment blocks 42.

Both the right and left hand release latches 52 are tied together so that only one side needs to be operated to open both latches 52. A fourth aperture 54 or a boss is provided on the block of the rear attachment blocks 42 and aligns with a fifth aperture 56 or a boss provided on the release latches 52 for receiving the connector bar 48.

A second cable attachment feature 60, e.g., with a sixth aperture, is provided on both of the rear attachment blocks 42 allowing for mounting locations for the cable tensioning system 21. The sixth aperture preferably is formed on an outward feature of both of the rear attachment blocks 42 for connecting both the first and second tension cables 20, 22.

The pair of rear attachment blocks 42 are also provided with at least one second mounting bracket 62 to connect to the ends of the cross member 46. In a preferred embodiment the second mounting bracket 62 slide into the ends of the cross member 46 and at least one fastener, e.g., bolts, are provided to fix the cross member 46 to the brackets 62.

Preferably, a pair of rear mounting brackets indicated generally at 64 (see FIGS. 1-2) are provided.

In one preferred embodiment, the pair of rear attachment blocks 42 provides the cables 20,22 with a location to be fixed near the rear of the vehicle. The rear attachment blocks 42 also engage the rear mounting brackets 64 to provide the tension on the whole system. The release latch mechanism 50 is provided with the rear attachment blocks 42 to keep the tonneau securely closed until operated. The release latch mechanism 50 holds the tonneau in the closed position tension state to keep the tonneau secured and tight until the cover is opened by an operator. The right and left side latches 52,52 are operably linked together such that only one of these latches 52,52 needs to be interfaced with by an operator for both latches 52,52 to be released. The rear mounting brackets 64 provide a location for the rear attachment blocks 42 to engage and provide system tension. The brackets 64 are a bolt-on feature, and, alternatively, a feature that is incorporated in the vehicle bed without the need of the additional bracket. The front attachment blocks 24 provide the cable system 21 with forward mounting locations for the cables 20,22. The front attachment blocks 24 also operably attach and seal the front bulkhead bow 26 to the bulkhead of the vehicle bed, preferably, without the need to drill attachment holes. Optionally, a soft cover or boot cover is operably attached to the front bulkhead bow 26 that wraps and protects the top cover 12 and assembly components when the cover 12 is opened and rolled up to the front of the vehicle bed in the stowed position.

Figure 8:
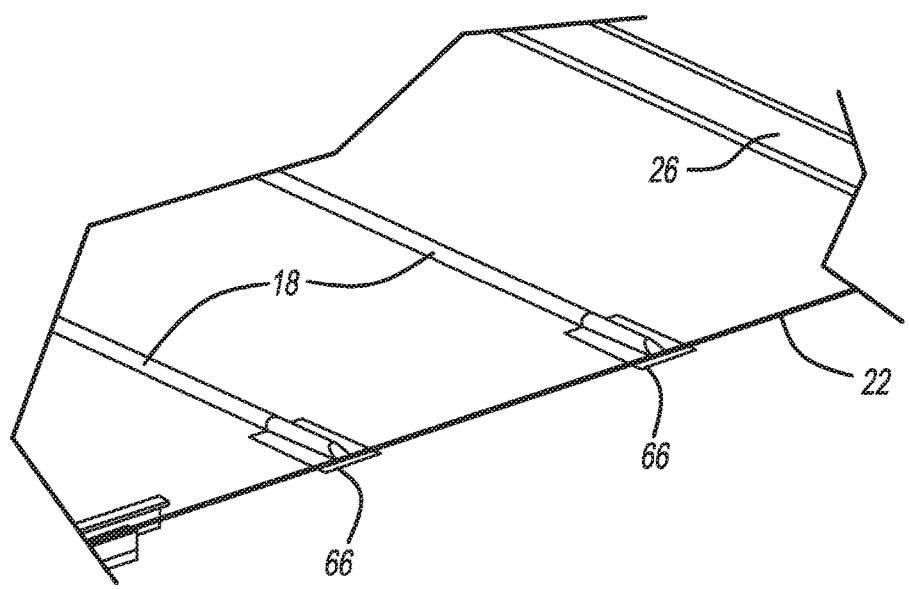

Referring to the Figures generally, and more particularly to FIG. 8, where the vehicle bedrails are omitted for clarity, in a preferred embodiment, the cover management bows 18 or fabric management bows are operably provided with operably profiled/configured ends for preventing undesirable movement on the existing bed rails. Using a flat edge feature 66, the ends touch off on the vehicle bed rails setting the height of the bows 18, and therefore the cover 12. The flat edge 66 sits substantially flat on top of the bedrail such that the bows 18 cannot drop into the bed of the vehicle. An operable predetermined step feature formed in the bottom of the ends helps to set side to side positioning against the vehicle bed sides. By way of example, a step on the bottom drops in and sits just inside the bedrail such that the end cannot move too far either side. The flat edge is integrally formed with or an add on feature to the bows 18. Most preferably, the flat edge features 66 are molded bow ends operably connected to the fabric management bows 18 such that the bow ends lay on top of the predetermined vehicle bed section providing up/down engagement and side to side location and engagement, eliminating the need of a side rail to provide these engagements. Preferably, the molded bow ends are connected to the underside of the cover 12 by adhesive and/or sewn to the cover, and form a pocket to receive the bow 18 ends.

Referring to FIGS. 1-8 generally, the tonneau cover assembly 10 eliminates side rails from the system. In accordance with a preferred embodiment of the present invention, the cable tensioning system incorporates cables 20, 22 used to create cover 12 tension and seal the cover 12 to the vehicle body. The assembly 10 uses the bedside to locate the fabric management bows 18, 18 and cover 12 in their side to side and height orientations. The rear engagement feature, e.g., rear mounting brackets 64, can be an additional bracket as shown or incorporated into the bed. The front engagement to the bed feature, e.g., attachment arms 28, are drawing up on the bulkhead to locate/attach/seal. A significant advantage over conventional systems is the use of connected right and left hand latches 52,52 on a tonneau cover. The assembly 10 optionally includes an integrated fabric boot cover to protect the stowed system when rolled and stowed. Depending on the application, alternative stowing methods are contemplated without deviation from the present invention.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A tonneau cover assembly for a vehicle, comprising:
   a tensioning system to tension a top cover by providing tension to the sides of the top cover and to seal the top cover to a cargo bed of a vehicle;
   a front attachment assembly operably connected at a bulkhead of the vehicle, said front attachment assembly providing a pair of first mounting locations for the tensioning system;
   a rear attachment assembly operably connected to the vehicle and to the top cover, said rear attachment assembly providing a pair of second mounting locations for the tensioning system; and,
   at least one cover management bow including a flat surface at both ends that sets the location of the cover management bow on the bed rails of the vehicle.

2. The tonneau cover assembly of claim 1, wherein the tensioning system includes first and second cables for tensioning the top cover, said first and second cables connected to the first and second mounting locations and to the sides of the top cover.

3. The tonneau cover assembly of claim 2, wherein the front attachment assembly further includes a pair of front attachment blocks each including a first cable attachment feature with a first aperture for connecting one of the first and second cables.

4. The tonneau cover assembly of claim 3, further including a bulkhead bow operably connected to the pair of front attachment blocks and operably connected to the top cover.

5. The tonneau cover assembly of claim 2, wherein the rear attachment assembly further includes a pair of rear attachment blocks each including a second cable attachment feature with a sixth aperture for connecting one of the first and second cables.

6. The tonneau cover assembly of claim 5, wherein the rear attachment assembly further includes a pair of rear mounting brackets operably connected to the vehicle and providing a place for the rear attachment blocks to engage and provide system tension.

7. The tonneau cover assembly of claim 5, further including a rear cross member operably connected to the pair of rear attachment blocks.

8. The tonneau cover assembly of claim 5, further including a release latch mechanism operably coupled to the pair of rear attachment blocks operable to selectively release tension to open the rear attachment assembly with the top cover to a stowed position.

9. The tonneau cover assembly of claim 8, wherein the release latch mechanism includes two latches operably linked together and releasing one latch causes the other linked latch to also release.

10. A tonneau cover assembly for a vehicle with a cargo bed, comprising:
    a plurality of cables to tension a top cover by providing tension along the sides of the top cover and to seal the top cover to a cargo bed of a vehicle;
    a front attachment assembly including a pair of front attachment blocks each operably coupled to at least one of the cables, and operably connected to the vehicle for sealing with a bulkhead of the vehicle without the need to drill attachment points;
    a rear attachment assembly including a pair of rear attachment blocks each operably coupled to at least one of the cables, and operably connected to a rear latch mechanism to keep the cover securely closed until selectively operated to an open position; and
    a plurality of cover management bows operably connected to the top cover and having ends that set the location of the bows on the vehicle without requiring side rails on the tonneau cover assembly.

11. The tonneau cover assembly of claim 10, further comprising at least two rear mounting brackets operably fastened to the vehicle or incorporated in the vehicle cargo bed, providing a place for the rear attachment blocks to engage and provide system tension.

12. The tonneau cover assembly of claim 10, wherein the rear latching mechanism further comprises a pair of release latches connected by a connector bar, where release of one latch allows the other latch to release simultaneously.

13. The tonneau cover assembly of claim 10, wherein the front attachment assembly further comprises a front bulkhead bow operably connected to the pair of front attachment blocks and operably connected to the top cover.

14. The tonneau cover assembly of claim 13, wherein the front attachment blocks each further comprise:
    an attachment arm for fitting onto the vehicle bulkhead, the attachment arm having a second aperture;
    an opening for receiving a portion of the attachment arm;
    a first brace with a third aperture, wherein the first brace is sized to fit against the outside of the opening; and,
    at least one fastener;
    wherein the at least one fastener extends through the second and third apertures, and the attachment arm is drawn rearward when the at least one fastener is tightened to attach to the vehicle bulkhead and seal the front bulkhead bow to the bulkhead of the cargo bed.

15. The tonneau cover assembly of claim 10, wherein the front and rear attachment blocks each further include an outward located cable attachment feature with an aperture for connecting one of the first and second cables.

16. The tonneau cover assembly of claim 10, wherein the ends of the cover management bows have a flat bottom surface that contacts the vehicle's bed rails setting the height and location of the cover management bows.

17. A stowable/deployable tonneau cover assembly for a vehicle, comprising:
    a cable tensioning system comprising at least two cables running fore/aft along the vehicle bedside to tension a top cover;
    a front attachment assembly including a pair of front attachment blocks each connected to one of the cables, and operably connected to a bulkhead bow for sealing with a bulkhead of the vehicle;

a rear attachment assembly including a pair of rear attachment blocks each connected to one of the cables at the rear of the vehicle, and operably connected to a rear latch mechanism to keep the cover securely closed until selectively operated to an open position;

at least one rear bar operably coupled to the pair of rear attachment blocks and operably connected to the top cover;

a plurality of rear mounting brackets operably connected to the vehicle bed or integrated as part of the vehicle bed, said rear mounting brackets providing a location for both ends of the rear attachment assembly engage and provide tonneau cover assembly tension; and, at least one fabric management bow operably connected to the top cover and having ends that set the height and location of the cover management bow on the vehicle bedside;

wherein the cable tensioning system allows the tonneau cover assembly to tension the top cover, provides tension along the sides of the top cover to seal the top cover against the bedside of the vehicle, and provides cross car location to assist in locating the top cover and the at least one fabric management bow.

18. The tonneau cover assembly of claim 17, wherein the rear latching mechanism further comprises a pair of release latches connected by a connector bar, where release of one latch allows the other latch to release simultaneously.

19. The tonneau cover assembly of claim 17, further comprising a bulkhead bow operably connected to the pair of front attachment blocks and operably connected to the top cover.

20. The tonneau cover assembly of claim 17, wherein the front attachment blocks each further comprise:
   an attachment arm for fitting onto the vehicle bulkhead, the attachment arm having a second aperture;
   an opening for receiving a portion of the attachment arm;
   a first brace with a third aperture, wherein the first brace is sized to fit against the outside of the opening; and,
   at least one fastener;
   wherein the at least one fastener extends through the second and third apertures, and the attachment arm is drawn rearward when the at least one fastener is tightened to attach to the vehicle bulkhead and seal the front bulkhead bow to the bulkhead of the cargo bed.

* * * * *